United States Patent [19]

Schwarz

[11] Patent Number: 5,766,070
[45] Date of Patent: Jun. 16, 1998

[54] AIR DIFFUSER DEVICE

[75] Inventor: Stefan Schwarz, Rochester Hills, Mich.

[73] Assignee: Valeo Klimasysteme GmbH, Rodach, Germany

[21] Appl. No.: 648,076

[22] PCT Filed: Sep. 18, 1995

[86] PCT No.: PCT/EP95/03672

§ 371 Date: Aug. 5, 1996

§ 102(e) Date: Aug. 5, 1996

[87] PCT Pub. No.: WO96/09181

PCT Pub. Date: Mar. 28, 1996

[30] Foreign Application Priority Data

Sep. 21, 1994 [DE] Germany ............... 44 33 698.5

[51] Int. Cl.$^6$ ................................................ F24F 13/15
[52] U.S. Cl. ............................................... 454/155; 454/315
[58] Field of Search ............................. 454/155, 315

[56] References Cited

U.S. PATENT DOCUMENTS

| | | | |
|---|---|---|---|
| 4,796,518 | 1/1989 | Murray | 454/155 |
| 5,364,303 | 11/1994 | Terry | 454/155 |

FOREIGN PATENT DOCUMENTS

| | | |
|---|---|---|
| 0 397 909 | 11/1990 | European Pat. Off. |
| 37 19 837 | 1/1989 | Germany . |
| 771784 | 4/1957 | United Kingdom ............ 454/315 |

OTHER PUBLICATIONS

Patent Abstracts of Japan, JP60244619, Dec. 1985, Toyoda Gosei KK.

*Primary Examiner*—Harold Joyce
*Attorney, Agent, or Firm*—Morgan & Finnegan, L.L.P.

[57] ABSTRACT

The air diffuser device contains front horizontal deflecting fins [(L1 to L5)] and rear vertical deflecting fins [(L6 to L10)] capable of swinging relative to a nozzle housing [(GH)], said deflecting fins in each case being connected to each other via a coupling rod [(K1; K2)]. The front and rear deflecting fins are adjustable by an operating/adjusting element [(B)] guided along a front deflecting fin [(L3)]. For the mutually independent adjustability of the front deflecting fins, on the one hand, and the rear deflecting fins on the other hand, the operating/adjusting element [(B)] is connected on the back side via a ball joint [(B3; V1)] with a connecting/adjusting element [(V)], which in turn is articulated on the rear deflecting fins with lengthwise displaceability perpendicular to the axis of swivel of said deflecting fins.

12 Claims, 3 Drawing Sheets

AIR DIFFUSER DEVICE

FIELD OF THE INVENTION

The invention relates to an air diffuser device. Such air diffuser devices are intended especially for nozzle openings of ventilation or air-conditioning systems in motor vehicles in the interior of the latter.

BACKGROUND OF THE INVENTION

An air diffuser device closing off an air nozzle in the dashboard of a motor vehicle is known from EP-B1-0 397 909. In connection with said device, for the directed outflow of a stream of air, deflecting fins capable of pivoting about a horizontal axis and mutually connected via a coupling rod can be adjusted in that an operating/adjusting element is displaceably guided perpendicular to the axis of swivel of the deflecting fins along a lattice bridge on the front side of the nozzle housing, such element mating with a back-side spur rack with a toothed arc shaped by molding on the front edge of a deflecting fin. In this way, when the operating/adjusting element is displaced lengthwise along the lattice bridge, the one deflecting fin provided with the toothed arc is adjusted in the sense of a certain direction of outflow, and the other deflecting fins are carried along and driven into corresponding angular positions via the common coupling rod.

According to the task of the invention in connection with an air diffuser device with a frontal particularly horizontal plane of deflecting fins, with a plurality of horizontal deflecting fins, adjustable via a first coupling rod, and with a plane of deflecting fins arranged behind it, with a plurality of particularly vertical deflecting fins, adjustable via a second coupling rod, mutual independence of the adjustment possibility between the deflecting fins of the first plane of deflecting fins, on the one hand, and the deflecting fins of the second plane of deflecting fins, on the other hand, is to be achieved even if the adjustment takes place only by means of one single operating/adjusting element, the latter being adjustably supported on one deflecting fin of the first plane of deflecting fins. Said task is solved in a particularly simple way in terms of manufacturing and installation technology in that the operating/adjusting element is coupled via a ball joint with an adjusting element to a connecting/adjusting element to a connecting/adjusting element for adjusting the deflecting fins of the rear plane of deflecting fins. Advantageous developments of said invention are the subject matter of the subsidiary claims.

Owing to the ball joint connection according to the invention, between a front operating/adjusting element guided on a deflecting fin of the front plane of deflecting fins, on the one hand, and a connecting/adjusting element for the deflecting fins of the rear plane of deflecting fins, on the other hand, the front deflecting fins can be tilted via the operating/adjusting element in the sense of a certain deflection of the stream of air without influencing the setting of the deflecting fins of the rear plane of deflecting fins, on the one hand, and, on the other hand, the deflecting fins of the rear plane of deflecting fins can be safely adjusted by displacing the operating/adjusting element along the leading front deflecting fin even if the front deflecting fin has t o be guided along a curved front deflecting fin, deviating from a linear guidance, in particular in the sense of an appropriate design of the front view of the air diffuser device.

BRIEF DESCRIPTION OF THE DRAWINGS

The invention as well as other advantageous developments of the invention according to feature s of the subsidiary claims are explained in greater detail in the following by reference to exemplified embodiments schematically shown in the drawings, in which:

FIG. 1 shows the front view of an air diffuser device with the five deflecting fins L1 to L5 of a front plane of deflecting fins, said fins being capable of swinging about a horizontal axis and designed slightly curved in the sense of a certain design, and with five additional deflecting fins L6 to L10 of a rear plane of deflecting fins, the latter being capable of swinging about a vertical axis of swivel.

Figure 1:
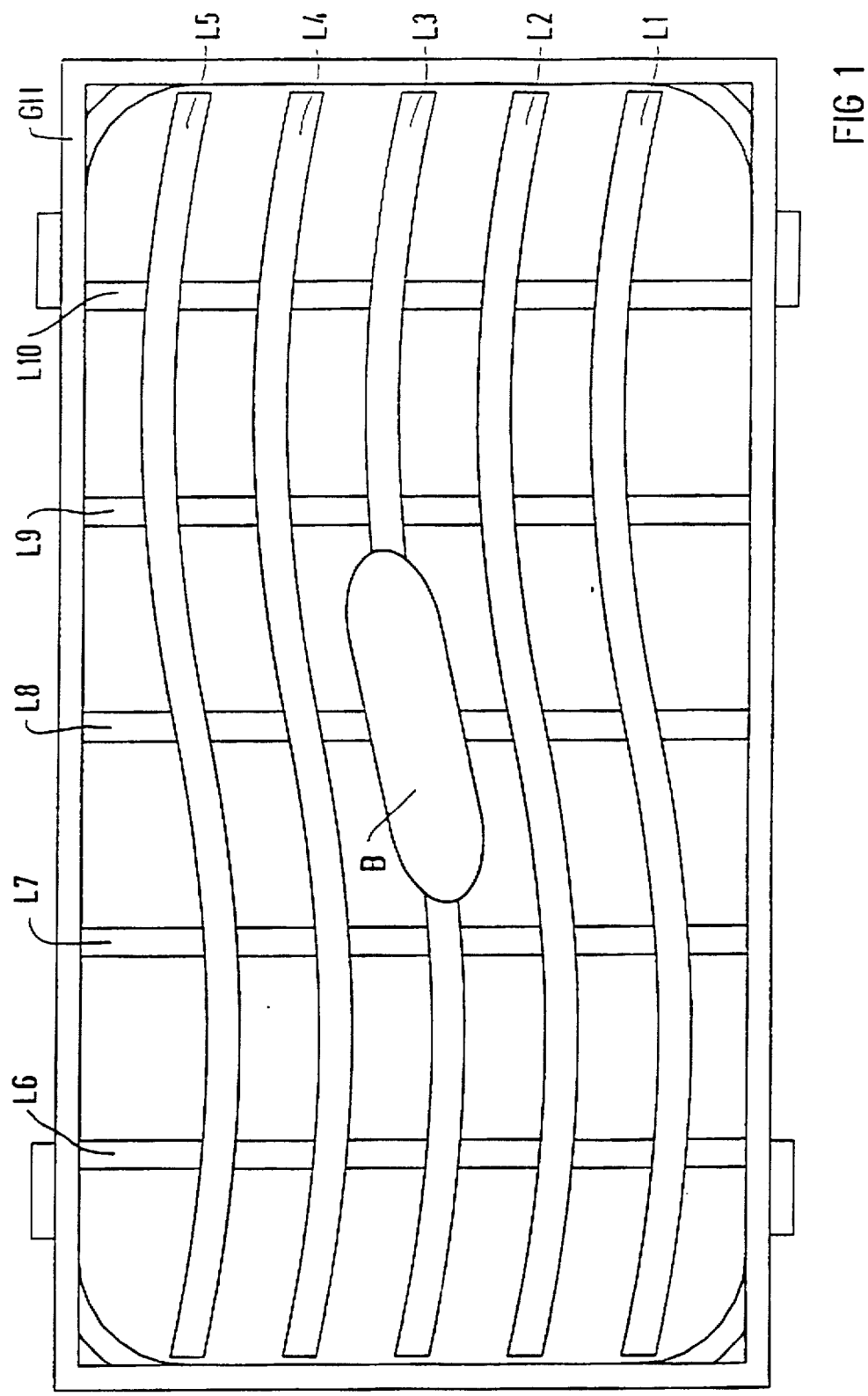
FIG. 1 shows the front view of an air diffuser device with deflecting fins of the front plane of deflecting fins extending curved in the sense of a certain design.
Figure 2:
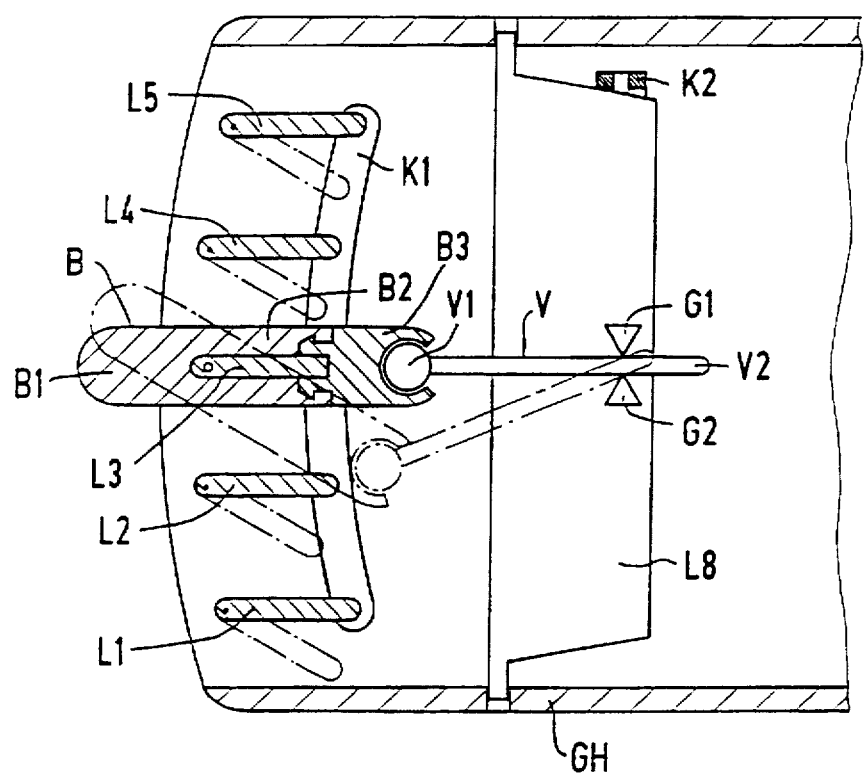
FIG. 2 shows a vertical center section through the air diffuser device according to FIG. 1.
Figure 3:
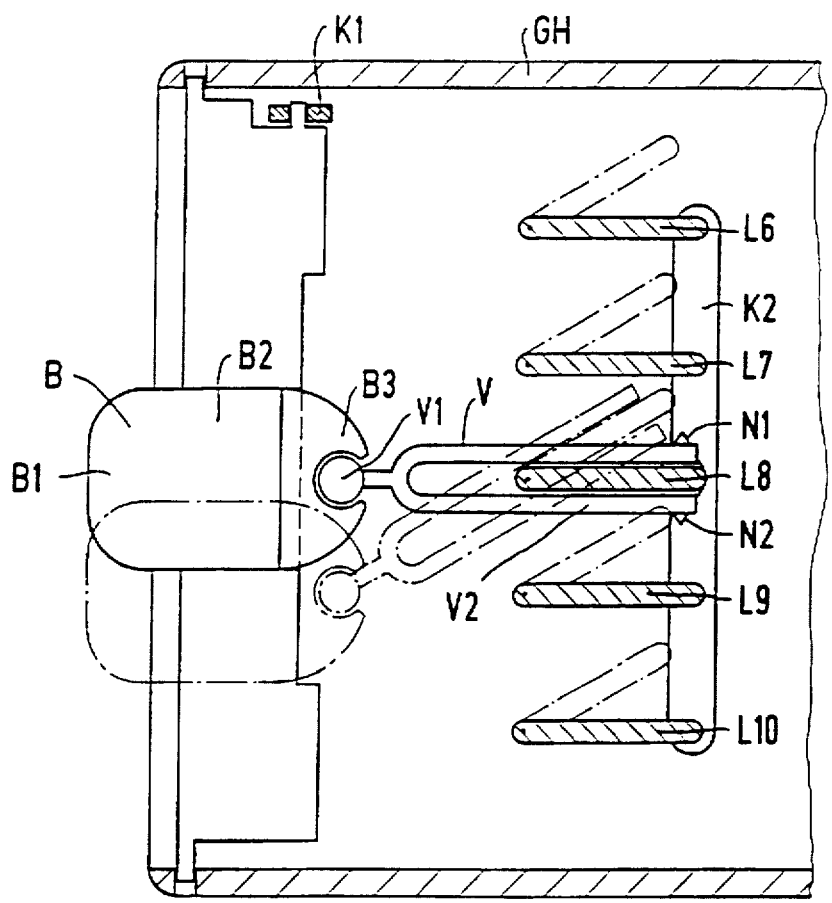
FIG. 3 shows a horizontal center section through the air diffuser device according to FIG. 1.

It is particularly shown in detail in FIG. 2 and 3 that the deflecting fins L1 to L5 of the front plane of deflecting fins are connected with each other by a coupling rod K1, and that the deflecting fins L6 to L10 are connected with each other by a coupling rod K2, in a way such that when a force of swivel acts on only one of the deflecting fins of the respective plane of deflecting fins, all other deflecting fins of such plane of deflecting fins are jointly adjustable. One single operating/adjusting element B serves for jointly setting both the deflecting fins, on the one hand, and the deflecting fins L6 to L10 of the rear plane of deflecting fins, on the other hand, said operating/adjusting element being guided on the one deflecting fin L3 of the front plane of deflecting fins in such a way that by swinging said element up and down, all deflecting fins L1 to L5 of the front plane of deflecting fins can be set to a certain angular position, and by displacing said element sideways along the deflecting fin L3, all deflecting fins L6 to L10 of the rear plane of deflecting fins can be adjusted to a certain angular position.

For the transmission of the adjustment between the operating/adjusting element B and the deflecting fins L6 to L10 of the rear plane of deflecting fins when the operating/adjusting element B is shifted sideways along the deflecting fin L3, a connecting/adjusting element V articulated on the deflecting fin L8 of the rear plane of deflecting fins is connected with the operating/adjusting element B via a ball joint V1; B3. For said purpose, the one end or first end V1 of the connecting/adjusting element V is, according to one development of the invention, designed in the form of a ball, and engaged at the rear end of the operating/adjusting element B by a ball socket part B3. The other end or second end V2 of the connecting/adjusting element V is supported with longitudinal displaceability relative to the deflecting fin L8 of the rear plane of deflecting fins in a way such that swinging of the deflecting fin L8 is assured even with wide lateral deflection of the operating/adjusting element B along the deflecting fin L3. For said purpose, the other end V2 of the connecting/adjusting element V is designed in the form of a fork, in a way which is particularly simple in terms of manufacturing technology, and receives the deflecting fin L8 between its fork-like ends, said fin resting with sliding contact on said ends. As an additional guiding element for the other end V2 of the connecting/adjusting element V, provision is made on the deflecting fin L8 for the sliding cams G1; G2, the latter preferably forming one piece with said fin and particularly being shaped thereon by molding. The other end V2 of the connecting/adjusting element V is capable of sliding between said cams and is thus prevented from any undesirable excessive vertical, uncontrolled swinging.

Instead of the fork-like receptacle shown here it is possible also to make provision for a needle-shaped design of the other end of the connecting/adjusting element V, whereby such a needle is pluggable into a slotted hole-like guide of the deflecting fin L8.

In the sense of an advantageous manufacture especially for an axial installation method, the operating/adjusting element B consists of a front control part B1 and a center guide part B2, the latter being guided on the deflecting fin L3 and particularly pluggable over the deflecting fin L3 from its front side in the way of a fork, as well as a back side component ball socket part B3, which can be prefabricated separately and plugged over the center guide part B2 during the installation. In the sense of a simple axial plugging method, the ball socket part B3 is axially opened and designed elastically, in a way such that the ball-shaped end V1 of the connecting/adjusting element V can be pressed into the ball socket part B3 of the operating/adjusting element B.

I claim:

1. An air diffuser device comprising a front first plane of deflecting fins with a plurality of horizontal deflecting fins adjustable via a first coupling rod, and a second plane of deflecting fins arranged to the rear of the first plane of deflecting fins and comprising a plurality of vertical deflecting fins adjustable via a second coupling rod, whereby an operating/adjusting element guided along a deflecting fin of the first plane of deflecting fins is connected via a ball joint with a connecting/adjusting element for the deflecting fins of the second plane of deflecting fins;

wherein said connecting/adjusting element has a ball-shaped first end and is received in a ball socket part of the operating/adjusting element to form the ball joint, and with a second end of the connecting/adjusting element articulated on a deflecting fin of the second plane of deflecting fins with lengthwise displaceability relative to an axis of swivel of said deflecting fin of the second plane of deflecting fins and wherein said second end is fork-shaped and extends laterally across the deflecting fin of the second plane of deflecting fins; and with a guidance of the second end of the connecting/adjusting element relative to the deflecting fin of the second plane of deflecting fins by means of sliding cams, the latter being provided on said deflecting fin of the second plane of deflecting fins and shaped thereon by molding and forming one piece with said deflecting fin of the second plane of deflecting fins.

2. A an air diffuser device according to claim 1, with said operating/adjusting element with a control part within a range of a front plane of delimitation of the first plane of deflecting fins, a center guide part on the deflecting fin of the first plane of deflecting fins, and the ball socket part.

3. An air diffuser device according to claim 1, with a guidance of the second end of the connecting/adjusting element relative to the deflecting fin of the second plane of deflecting fins by means of sliding cams, the latter being provided on said deflecting fin of the second plane of deflecting fins and shaped thereon by molding and forming one piece with said deflecting fin of the second plane of deflecting fins.

4. An air diffuser device according to claim 1, with said operating/adjusting element with a center guide part engaging the deflecting fin of the first plane of deflecting fins from a front side of said deflecting fin of the first plane of deflecting fins in the way of a fork; and with said ball socket part lockable with the tips of the fork of said center guide part.

5. An air diffuser device according to claim 1, with parts of the operating/adjusting element and of the connecting/adjusting element each being designed for assembly by an axial installation method.

6. An air diffuser device according to claim 1, with a design of the deflecting fins deviating from a straight alignment.

7. An air diffuser device according to claim 3, with said operating/adjusting element with a center guide part engaging the deflecting fin of the first plane of deflecting fins from a front side of said deflecting fin of the first plane of deflecting fins in the way of a fork; and with said ball socket part lockable with the tips of the fork of said center guide part.

8. An air diffuser device according to claim 4, with parts of the operating/adjusting element and of the connecting/adjusting element each being designed for assembly by an axial installation method.

9. An air diffuser device according to claim 5, with a design of the deflecting fins deviating from a straight alignment.

10. The air diffuser device of claim 1, wherein the air diffuser device is for interior-side nozzle openings of ventilation and air-conditioning systems in a motor vehicle.

11. An air diffuser device comprising a first plane of deflecting fins with a plurality of horizontal deflecting fins adjustable via a first coupling rod, and a second plane of deflecting fins arranged to the rear of the first plane of deflecting fins and comprising a plurality of vertical deflecting fins adjustable via a second coupling rod, whereby an operating/adjusting element guided along a deflecting fin of the first plane of deflecting fins is connected via a ball joint with a connecting/adjusting element for the deflecting fins of the second plane of deflecting fins;

wherein said connecting/adjusting element has a ball-shaped first end and is received in a ball socket part of the operating/adjusting element to form the ball joint, and with a second end of the connecting/adjusting element articulated on a deflecting fin of the second plane of deflecting fins with lengthwise displaceability relative to an axis of swivel of said deflecting fin of the second plane of deflecting fins and wherein said second end is fork-shaped and extends a substantial distance laterally across the deflecting fin of the second plane of deflecting fins; and with a guidance of the second end of the connecting/adjusting element relative to the deflecting fin of the second plane of deflecting fins by means of sliding cams, the latter being provided on said deflecting fin of the second plane of deflecting fins and shaped thereon by molding and forming one piece with said deflecting fin of the second plane of deflecting fins.

12. An air diffuser device comprising a first plane of deflecting fins with a plurality of horizontal deflecting fins adjustable via a first coupling rod, and a second plane of deflecting fins arranged to the rear of the first plane of deflecting fins and comprising a plurality of vertical deflecting fins adjustable via a second coupling rod, whereby an operating/adjusting element guided along a deflecting fin of the first plane of deflecting fins is connected via a ball joint with a connecting/adjusting element for the deflecting fins of the second plane of deflecting fins; and with said operating/adjusting element with a center guide part engaging the deflecting fin of the first plane of deflecting fins from a front side of said deflecting fin of the first plane of deflecting fins in the way of a fork; and with a ball socket part of said ball joint lockable with the fork of the center guide part.

* * * * *